United States Patent
Van Vuuren

(10) Patent No.: US 6,244,354 B1
(45) Date of Patent: Jun. 12, 2001

(54) DEVICE AND PROCESS FOR CUTTING GRASS SODS WITH A CONSTANT THICKNESS FROM GRASS LAND

(75) Inventor: Johannes Van Vuuren, Harmelen (NL)

(73) Assignee: Harmelerwaard Patents B.V. (NL)

( * ) Notice: Subject to any disclaimer, the term of this patent is extended or adjusted under 35 U.S.C. 154(b) by 0 days.

(21) Appl. No.: 09/489,129

(22) Filed: Jun. 8, 1998

Related U.S. Application Data

(63) Continuation-in-part of application No. 08/713,923, filed on Sep. 13, 1996, now abandoned.

(30) Foreign Application Priority Data

Sep. 15, 1995 (NL) .................................................. 1001212

(51) Int. Cl.$^7$ .................................................. A01B 45/04
(52) U.S. Cl. .................................................. 172/19
(58) Field of Search .................. 172/2, 19, 20, 172/35

(56) References Cited

U.S. PATENT DOCUMENTS

| 2,614,477 | 10/1952 | Habenicht . | |
|---|---|---|---|
| 3,509,944 | 5/1970 | Brouwer et al. | 172/19 |
| 3,540,535 | 11/1970 | Brouwer et al. | 172/20 |
| 3,590,927 | 7/1971 | Brouwer et al. | 172/19 |
| 3,658,134 | 4/1972 | Bibby | 172/20 |
| 3,807,504 | 4/1974 | Nunes, Jr. | 172/20 |
| 4,616,713 | 10/1986 | Shattuck | 172/19 |
| 4,632,192 | 12/1986 | Hooks | 172/19 |
| 4,892,152 | 1/1990 | van Vuuren | 172/20 |

FOREIGN PATENT DOCUMENTS

| 2738265 | 3/1979 | (DE) . |
| 0153103 | 8/1985 | (EP) . |
| 9502317 | 1/1995 | (WO) . |

Primary Examiner—Christopher J. Novosad

(57) ABSTRACT

A method and apparatus for cutting a grass sod from a grass land are disclosed. The apparatus includes a cutting blade positioned between a front end and rear end of a sod cutting apparatus. An adjusting mechanism adjusts the position of the cutting blade to cut the grass sod a predetermined distance below a surface of the grass sod. A measuring mechanism measures a profile of the grass sod to be cut from the grass land and/or a thickness of the cut grass sod. A controller is connected to the measuring mechanism and the adjusting mechanism. The controller causes the adjusting mechanism to adjust the position of the cutting blade in response to the measuring mechanism detecting changes in the profile of the grass sod to be cut from the grass land and/or the thickness of the cut grass sod. The method includes setting a cutting blade to cut from the grass land the grass sod having the predetermined thickness. During cutting of the grass sod from the grass land, a profile of the grass sod and/or a thickness of the cut grass sod is determined. In response to detecting variations in the profile and/or the thickness of the cut grass sod, the cutting blade is adjusted to maintain the cut grass sod at the predetermined thickness.

15 Claims, 6 Drawing Sheets

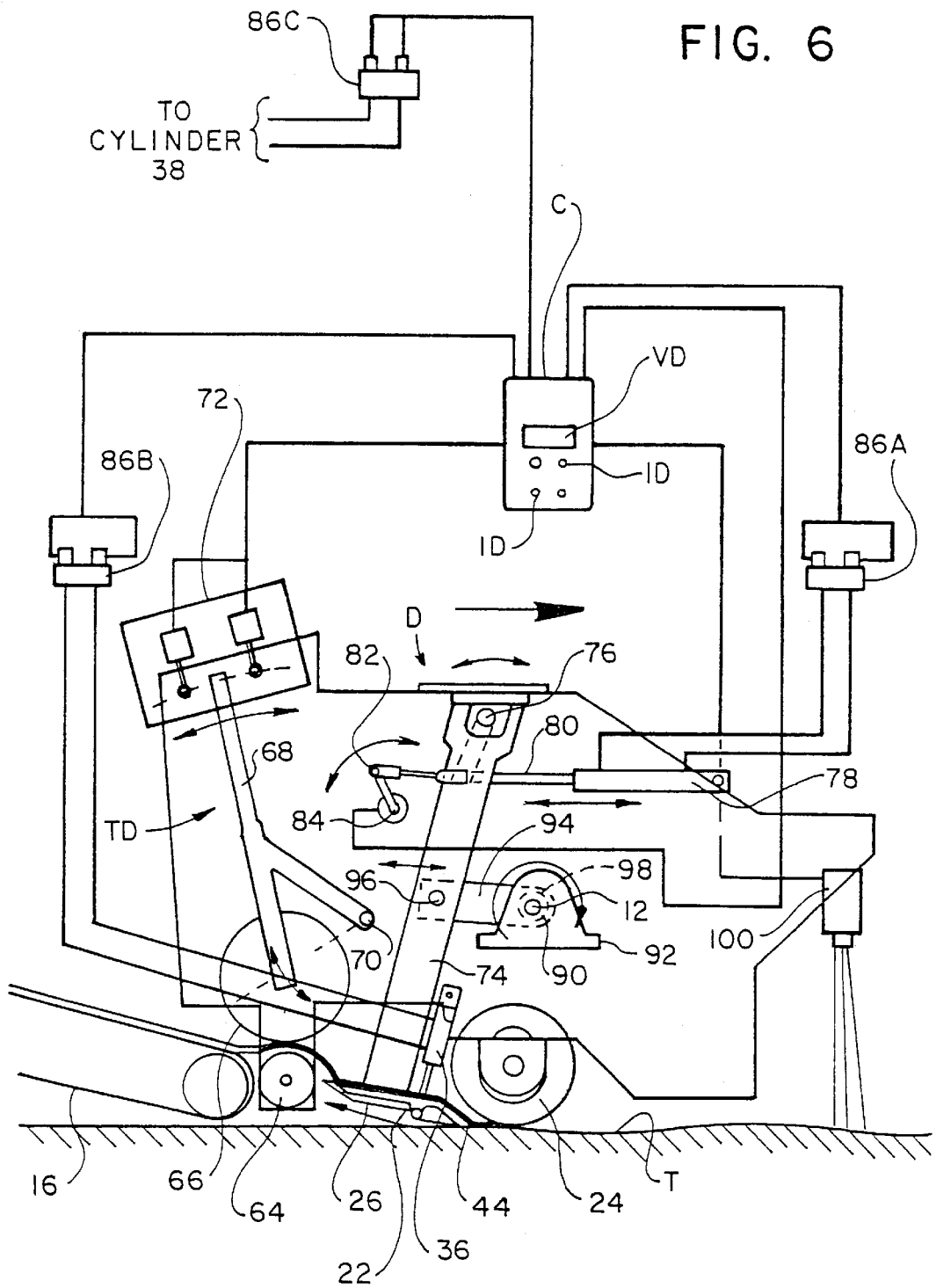

DEVICE AND PROCESS FOR CUTTING GRASS SODS WITH A CONSTANT THICKNESS FROM GRASS LAND

CROSS REFERENCE TO RELATED APPLICATIONS

This application is a continuation-in-part of U.S. patent application Ser. No. 08/713,923, filed Sep. 13, 1996, now abandoned.

BACKGROUND OF THE INVENTION

1. Field of the Invention

This invention relates to cutting grass sods from grass land.

2. Background Art

Grass sod is utilized to quickly form large grass surfaces such as sports fields, golf courses and lawns. The grass sod is cut from a grass land and typically has a breadth of between 24 and 48 inches. The cut grass sod is collected as a roll or a slab.

It is desirable that the cut grass sod have a constant thickness over its length and breadth. However, the grass land from which the grass sod is cut often has sloping terrain over the length and/or breadth of the grass sod wherein the terrain is slightly hollow or slightly rounded. Because of the sloping terrain, difficulties are encountered maintaining the thickness of the grass sod constant over its length and/or breadth. This varying thickness yields problems during laying of sports fields and the like which must be as flat as possible. Moreover, the thickness of the cut grass sod is dependent on the application. For example, a golfing green or a high quality sports field would utilize a grass sod that is preferably cut as thinly as possible. Conversely, for gardens or planting grass fields, the grass sods can be cut thicker. If the grass sod is cut from a sloping terrain, a temporary "dead" spot can be produced. This is a particular problem when the grass sod is cut as thinly as possible, such as for golfing greens or high quality sports fields. In applications where thicker grass sods can be utilized, it is important to cut the grass sod at a substantially constant thickness over its length and/or breadth in order to reduce transportation costs moreover, it is desirable to cut the grass sods at a substantially uniform thickness over its breadth in order to avoid a stack or roll of grass sod from sagging to one side or, in the case of narrow rolls or stacks of grass sods, from falling over.

It is an object of the present invention to provide a method and apparatus for cutting a grass sod of a substantially uniform thickness over its length and breadth.

SUMMARY OF THE INVENTION

Accordingly, I have invented an apparatus for cutting a grass sod from a grass land. The apparatus includes a chassis having a front end and a back end. A cutting blade is received on an adjusting mechanism which is coupled to the chassis and which adjusts a position of the cutting blade to cut the grass sod a predetermined distance below a surface of the grass sod. A measuring mechanism measures a profile of the grass sod to be cut from the grass land and/or a thickness of the cut grass sod. A controller is connected to the measuring mechanism and the adjusting mechanism. The controller causes the adjusting mechanism to adjust the position of the cutting blade in response to the measuring mechanism detecting changes in the profile of the grass sod to be cut from the grass land and/or a thickness of the cut grass sod.

The measuring mechanism can include a ground profile detector and/or a sod thickness detector. The ground profile detector is positioned adjacent the front end of the chassis for detecting a profile of the surface of the grass sod to be cut from the grass land. The sod thickness detector is positioned between the cutting blade and the back end of the chassis for detecting a thickness of the cut grass sod.

The cutting blade can be flexible and the controller can cause the adjusting mechanism to adjust the flexion of the cutting blade in response to the measuring mechanism detecting changes in the lateral profile of the grass sod to be cut from grass land and/or a lateral thickness of the cut grass sod.

I have also invented a method of cutting from a grass land a grass sod having a predetermined thickness. The method includes setting a cutting blade to cut from the grass land the grass sod having the predetermined thickness. During cutting of the grass sod from the grass land, a profile of the grass sod to be cut and/or a thickness of the cut grass sod is determined. In response to variations in the profile and/or the determined thickness, the cutting blade is adjusted to maintain the cut grass sod at the predetermined thickness.

BRIEF DESCRIPTION OF THE DRAWINGS

FIG. 6 is the side elevational view shown in FIG. 5 including an alternate embodiment of the measuring mechanism.

DESCRIPTION OF THE PREFERRED EMBODIMENTS

Figure 1:
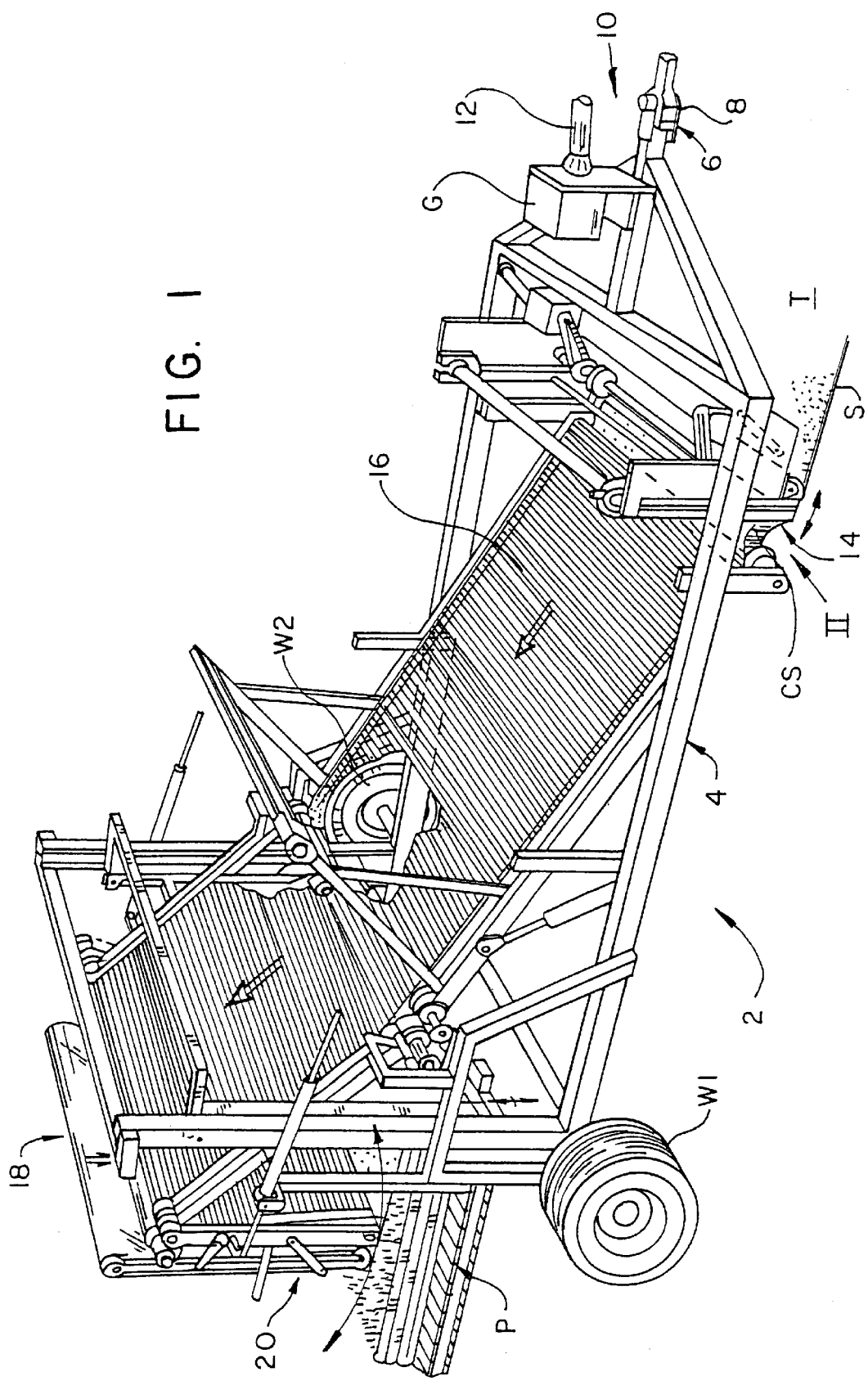
FIG. 1 is a perspective view of a preferred embodiment of a sod cutting apparatus in accordance with the present invention.

With reference to FIG. 1, a sod cutting apparatus 2 includes a chassis 4 having wheels W1 and W2 positioned on opposite sides thereof. The chassis 4 is connectable to a tractor (not shown) via a coupling 6 and a rod 8 positioned at a front end 10 of the chassis 4. The sod cutting apparatus 2 can also include a gear box G which is connectable to a driven axle 12 of the tractor.

A cutting unit 14 is disposed adjacent the front end 10 of the chassis 4 for cutting a grass sod S from a grass land. A conveyor 16 is positioned to receive the cut grass sod CS from the cutting unit 14 and to convey the cut grass sod CS upwardly to a transport mechanism 18 mounted adjacent a back end 20 of the chassis 4. The transport mechanism 18 is utilized to stack up the cut grass sod CS in large rolls or in a zigzag manner on a holder P also positioned adjacent the back end 20 of the chassis 4.

Figure 2:
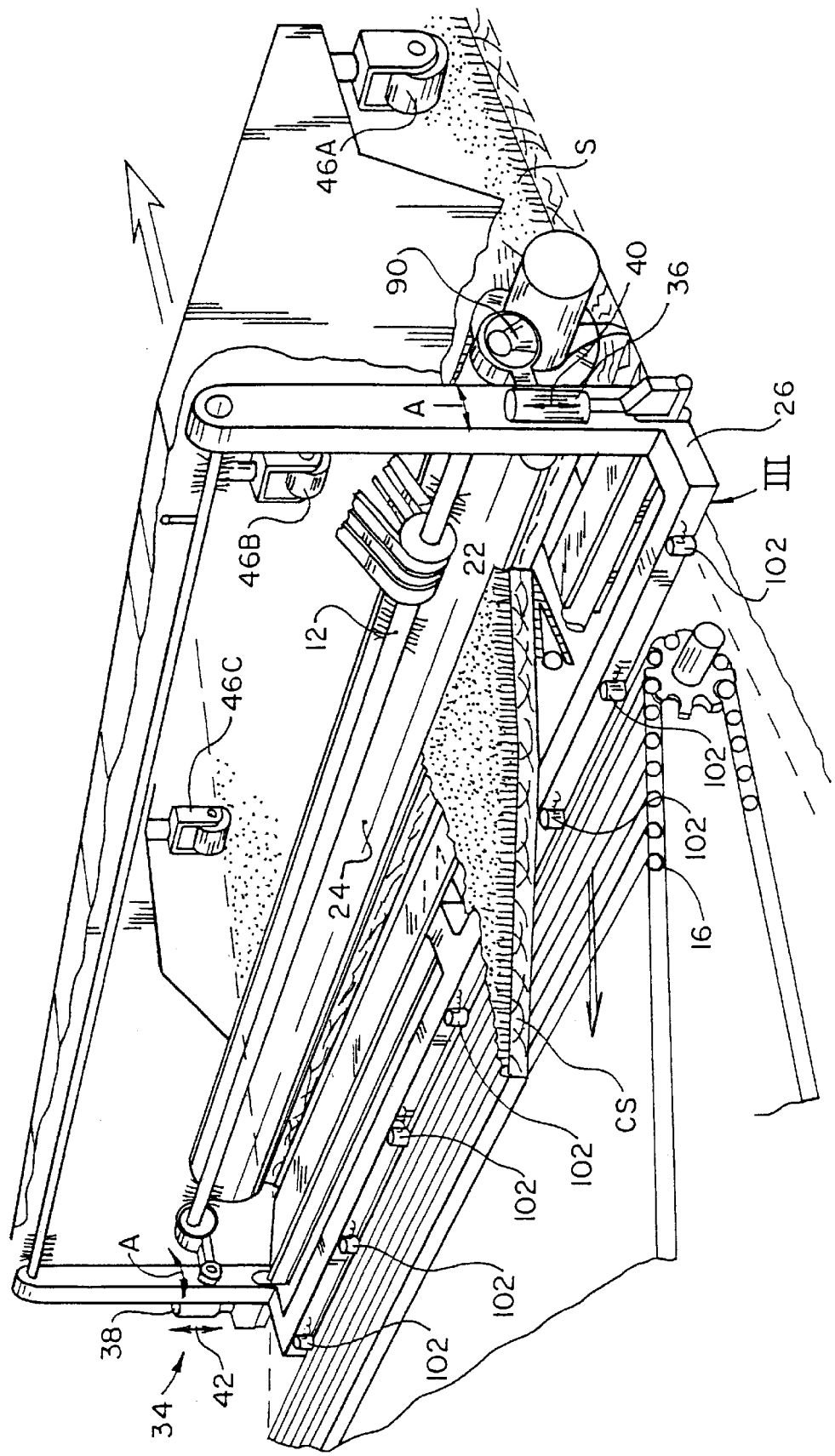
FIG. 2 is a perspective view of detail II in FIG. 1.

With reference to FIG. 2 and with ongoing reference to FIG. 1, the cutting unit 14 includes a cutting blade 22 positioned laterally between the sides of the chassis 4 and a flexible roller 24 fixedly positioned between the cutting blade 22 and the front end 10 of the chassis 4. The cutting blade 22 extends under the grass sod S a predetermined distance for cutting the grass sod S from the grass land. Preferably, the cutting blade 22 is movable to and fro between the front end 10 and the back end 20 of the chassis 4, as shown by the double arrow A. The cutting blade 22 is also adjustable with respect to a top surface T of the grass sod S by adjustment of a frame part 26, in a manner to be described hereinafter.

Figure 3:
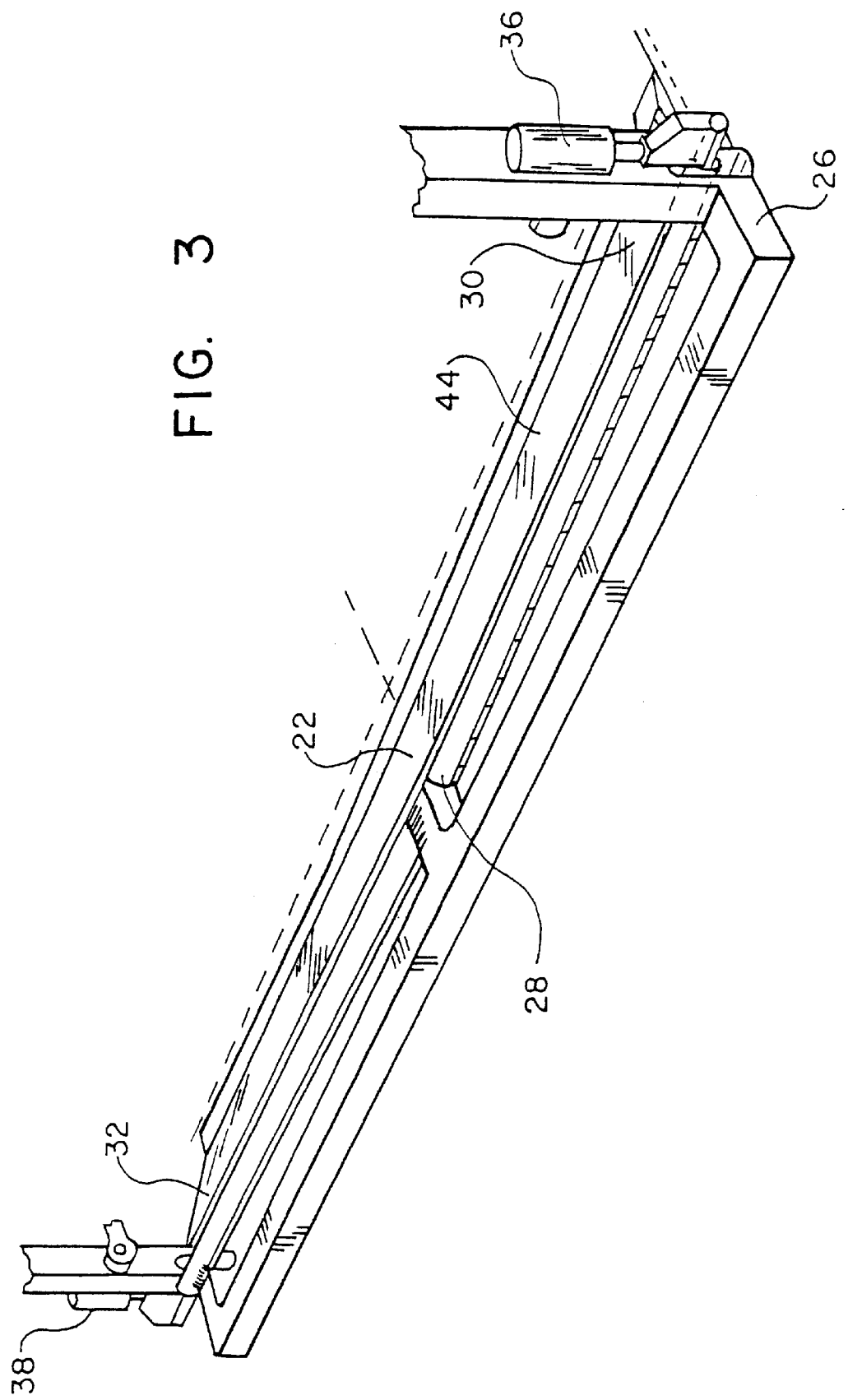
FIG. 3 is a perspective view of detail III in FIG. 2 with a cutting blade positioned in an alternate working position.

With reference to FIG. 3 and with ongoing reference to FIG. 2, preferably, the cutting blade 22 has a central part 28 secured to the frame part 26, and opposite ends 30 and 32 of the cutting blade 22 are flexible with respect to the frame part 26. A flexion adjusting mechanism 34 is connected between the cutting blade 22 and the frame part 26. The flexion adjusting mechanism 34 enables the curvature or flexion of the cutting blade 22 to be selectively adjusted. More specifically, the flexion adjustment mechanism 34 includes adjustment cylinders 36 and 38 connected between the frame part 26 and the ends 30 and 32, respectively, of the cutting blade 22. The cylinders 36 and 38 enable the ends 30 and 32, respectively, of the cutting blade 22 to be flexed upwardly or downwardly relative to the central part 28 of the cutting blade 22, as shown by the double arrows 40 and 42 in FIG. 2. Suitable adjustment of the cylinders 36 and 38 enables the curvature or flexion of the cutting blade 22 to be selectively set.

In order to cut the grass sod S having a substantially constant thickness over its breadth, the cylinders 36 and 38 are adjusted so that the flexion of the cutting blade 22 corresponds to a lateral profile or contour of the grass sod S to be cut from the grass land. For example, as shown in FIG. 3, to cut a grass sod S from a terrain having a concave surface, the cylinders 36 and 38 are adjusted so that the ends 30 and 32, respectively, of the cutting blade 22 are upwardly adjusted with respect to the central part 28 of the cutting blade 22. Similarly, to cut a grass sod S from a terrain having a convex surface, the cylinders 36 and 38 are adjusted so that the ends 30 and 32, respectively, of the cutting blade 22 are downwardly adjusted with respect to the central part 28 of the cutting blade 22. Moreover, the cylinder 36 can be adjusted upwardly and the cylinder 38 can be adjusted downwardly, or vice versa, so that the flexion of the cutting blade 22 is set to correspond to a terrain having an S shape surface.

Figure 4:
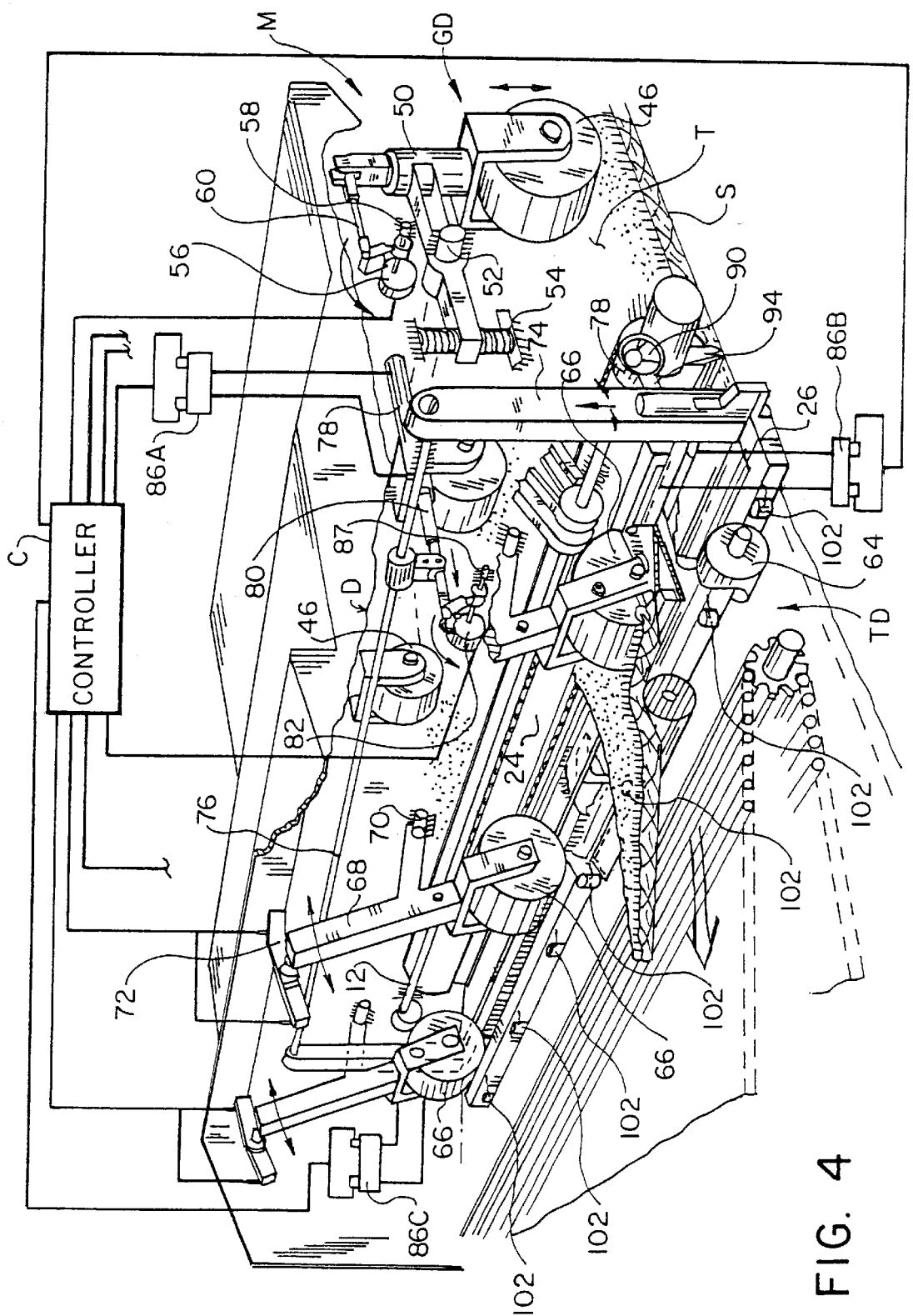
FIG. 4 is a perspective view of FIG. 2 including a measuring mechanism and an adjustment mechanism in accordance with the present invention.

With reference to FIG. 4, the sod cutting apparatus 2 includes a measuring mechanism M which includes a ground profile detector GD which detects a profile of the grass sod S to be cut from the grass land and/or a sod thickness detector TD which measures a thickness of the cut grass sod CS. An adjusting mechanism D is connected between the chassis 4 and the cutting blade 22. The adjusting mechanism D is configured to adjust the position of the cutting blade 22 to set a cutting edge 44 (FIG. 3) of the cutting blade 22 a predetermined distance below the top surface T of the grass sod S. A controller C is connected to the measuring mechanism M and the adjusting mechanism D. The controller C controls the adjusting mechanism D to adjust a position of the cutting blade 22 in response to the measuring mechanism M detecting changes in the profile of the grass sod S to be cut from the grass land and/or the thickness of the cut grass sod CS.

Figure 5:
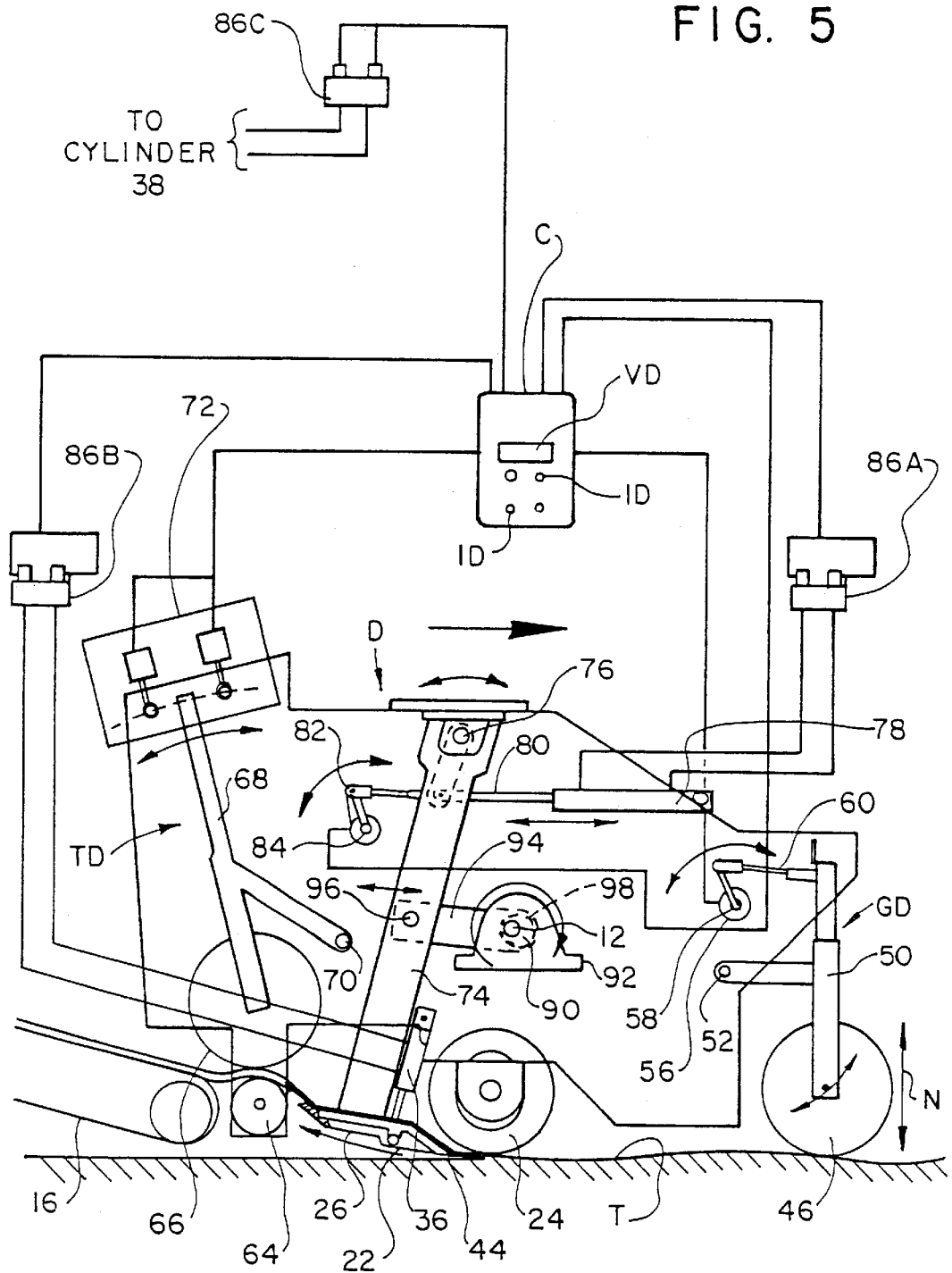
FIG. 5 is a side elevational view of the measuring mechanism and adjusting mechanism of FIG. 4.

With reference to FIG. 5 and with ongoing reference to FIG. 4, to measure the profile of the grass sod S to be cut from the grass land, the ground profile detector GD of the measuring mechanism M includes a plurality of running wheels 46 connected across the chassis 4 adjacent the front end 10 and rollable over a top surface T of the grass land. Each running wheel 46 is connected to a strut 50 which is pivotally connected to an axle 52 which is secured to the chassis 4. Each running wheel 46 is biased into contact with the top surface T of the grass sod S by one or more biasing springs 54 connected between the strut 50 and the chassis 4. A plurality of ground profile potentiometers 56 is connected to the chassis 4. Each ground profile potentiometer 56 has a shaft 58 connected to one of the struts 50 via a connecting assembly 60.

When cutting the grass sod S, each running wheel 46 rolls along and follows the contour or profile of the top surface T of the grass sod S. The strut 50, the axle 52 and the biasing springs 54 of each running wheel 46 enable it to maintain contact with and move normal N to the top surface T when the chassis 4 is moved relative to the grass sod S. Movement of each running wheel 46 normal N to the top surface T causes the strut 50 to pivot around the axle 52 thereby causing the connecting assembly 60 to rotate the shaft 58 of the ground profile potentiometer 56. Rotation of the shaft 58 adjusts an internal resistor (not shown) of the ground profile potentiometer 56. The internal resistor of each ground profile potentiometer 56 is connected to an input of the controller C which monitors the value of the internal resistor and causes the adjusting mechanism D to adjust the position of the cutting blade 22 in response to changes in the value of the internal resistor.

For measuring a thickness of the cut grass sod CS, the sod thickness detector TD of the measuring mechanism M includes a carriage wheel 64 positioned on the chassis 4 and a plurality of measuring wheels 66 connected across the chassis 4 adjacent the carriage wheel 64. Each measuring wheel 66 is connected to a strut 68 which is pivotally connected to an axle 70 which is secured to the chassis 4. A plurality of thickness potentiometers 72 is connected to the chassis 4. Each thickness potentiometer 72 is connected to an end of one of the struts 68 opposite the measuring wheel 66 for detecting the movement thereof in response to movement of the measuring wheel 66 normal N to the top surface T of the cut grass sod CS passing between the carriage wheel 64 and the measuring wheel 66. In response to movement of the measuring wheel 66 relative to the carriage wheel 64, the strut 68 pivots around axle 70 thereby causing the strut 68 to change the value of an internal resistor (not shown) of the thickness potentiometer 72. The internal resistor of each thickness potentiometer 72 is connected to an input of the controller C which monitors the resistance value and causes the adjusting mechanism D to adjust the position of the cutting blade 22 in response to changes in the value of the internal resistor.

The adjusting mechanism D includes the frame part 26 and a pair of struts 74 connected between opposite ends of the frame part 26 and the chassis 4. Each strut 74 is fixedly connected adjacent an opposite end of a rod 76 which is pivotally connected to the chassis 4 between opposite sides thereof. A cutting blade adjustment cylinder 78 is connected between the chassis 4 and the rod 76 via a connecting assembly 80. The controller C is connected to control the operation of the cutting blade adjustment cylinder 78 which is configured to adjust the position of the connecting assembly 80. Adjusting the position of the connecting assembly 80 rotates the struts 74 and rod 76 thereby adjusting the position of the cutting blade 22 relative to the top surface T of the grass sod S.

In the embodiment shown in FIG. 5, when the cutting blade adjustment cylinder 78 moves the connecting assembly 80 to the right, the struts 74 and the rod 76 rotate counterclockwise thereby increasing the distance between the cutting edge 44 of the cutting blade 22 and the top surface T of the grass sod S. Similarly, when the cutting blade adjustment cylinder 78 moves the connecting assembly 80 to the left, the struts 74 and the rod 76 rotate clockwise thereby decreasing the distance between the cutting edge 44 of the cutting blade 22 relative to the top surface T of the grass sod S.

A cutting blade potentiometer 82 is connected to the chassis 4. The cutting blade potentiometer 82 has a shaft 84 which is connected to the connecting assembly 80. In response to rotation of the shaft 84, an internal resistor (not shown) of the cutting blade potentiometer 82 is adjusted. The internal resistor of the cutting blade potentiometer 82 is connected to an input of the controller C which monitors the value of the internal resistor. In response to detecting changes in the value of the internal resistor of the cutting blade potentiometer 82, the controller C causes the adjustment cylinder 78 to adjust the position of the cutting blade 22 to maintain the cutting edge 44 at the predetermined distance below the top surface T of the grass sod S. The predetermined distance is set at the controller C prior to or during cutting of grass sod S. To enable setting and adjustment of the predetermined distance, the controller C includes one or more input devices ID, such as push-buttons, adjustment and the like, connected to digital and/or analog circuitry (not shown) of the controller C. The controller C can also include a visual display VD which displays the current setting of the cutting blade 22. The circuitry of the controller C, among other things, receives input from the input devices ID, controls the visual display and controls the adjustment of the cylinder 78 to set the position cutting blade 22 as a function operation of the input devices ID. The position of the cutting blade 22 can also be set manually and an input device ID of the controller C can be activated to establish the position of the cutting blade 22 in response to the manual setting thereof.

As discussed above, the controller C is connected to monitor the values of the internal resistors of the potentiometers 58, 72 and 82. The controller C is also connected to selectively control the operation of the cylinders 36, 38 and 78. Preferably, the controller C is connected to hydraulic control valves 86A–86C which selectively provide hydraulic fluid to cylinders 78, 36 and 38, respectively. More specifically, the controller controls the control valve 86A to selectively provide hydraulic fluid to one end of the cylinder 78. In response to receiving the hydraulic fluid from the control valve 86A, the cylinder 78 adjusts the position of the connecting assembly 80 in a manner known in the art. Similarly, the controller C controls the control valve 86B to selectively supply hydraulic fluid to one end of the cylinder 36. In response to receiving the hydraulic fluid from the control valve 86B, the cylinder 36 adjusts the position of the end 30 of the cutting blade 22 in a manner known in the art. Moreover, the controller controls the control valve 86C to selectively supply hydraulic fluid to one end of the cylinder 38 which adjusts the position of the end 32 of the cutting blade 22 in a manner known in the art.

In operation, the controller C causes the cylinder 78 to adjust the struts 74 so that the cutting edge 44 of the cutting blade 22 is positioned at the predetermined distance below the top surface T of the grass sod S. Moving the chassis 4 relative to the grass sod S causes the cutting blade 22 to cut the grass sod S from the grass land. The cut grass sod CS is received between the measuring wheel 66 and the carriage wheel 64. In response to each measuring wheel 66 moving relative to the carriage wheel 64, the value of the internal resistor of the thickness potentiometer 72 coupled thereto changes. Hence, the values of the internal resistors of the thickness potentiometers 72 are related to the lateral thickness of the cut grass sod CS. At the same time, in response to moving the chassis 4 relative to the grass sod S, each running wheel 46 rolls along and follows the profile of the top surface T of the grass sod S. In response to detecting changes in the profile of the grass sod S, each running wheel 46 moves normal to the top surface T thereby causing a change in the value of the internal resistor of the grid profile potentiometer 52 coupled thereto. Hence, the values of the internal resistances of the grid profile potentiometers 52 are related to the profile of the top surface T of the grass sod S.

The controller C monitors the values of the internal resistors of the plurality of potentiometers 58 and the plurality of potentiometers 72. In response to detecting changes in the values of the internal resistors of the plurality potentiometer 58 and/or the values of the internal resistors of the plurality of potentiometer 72, the controller C causes the cylinder 78 to adjust the position of the cutting blade 22 to maintain the thickness of the cut grass sod CS at the predetermined thickness. Since the potentiometer 82 is coupled to the cylinder 78 and the struts 74 via the connecting assembly 80, the value of the internal resistor of the potentiometer 82 is indicative of the position of the cutting blade 22. By monitoring the value of the internal resistor of the potentiometer 82, the controller C can determine the position of the cutting blade 22. Moreover, as discussed above, the controller C monitors the values of the internal resistors of the potentiometers 58 and 72. In response to detecting changes in the values of the internal resistors of the potentiometers 58 and 72, corresponding to variations in the profile of the grass sod S and the thickness of the cut grass sod CS, respectively, the controller C causes the cylinder 78 to adjust position of the cutting blade 22. By monitoring the internal resistance of the potentiometer 82, the controller C can determine the position of the cutting blade 22 relative to the top surface T of the grass sod S in response to adjustment of the cylinder 78.

In response to the running wheels 30 or the measuring wheels 66 encountering variances in the lateral profile of the grass sod S and/or variances in the lateral thickness of the cut grass sod CS, respectively, the controller C causes the adjustment cylinders 36 and 38 to adjust the flexion or curvature of the cutting blade 22. More specifically, the controller C causes the cylinders 36 and 38 to adjust the flexion of the cutting blade 22 to correspond to the variances in the lateral profile of the grass sod S and/or the lateral thickness of the cut grass sod CS. By selectively controlling the flexion of the cutting blade 22 and the position of the cutting blade 22 relative to the top surface T of the grass sod S, the controller C enables the cut grass sod CS to have a substantially uniform longitudinal and lateral thickness.

Preferably, during cutting of the grass sod S, the cutting blade 22 is moved reciprocatingly between the front end 10 and the back end 20 of the chassis 4. This reciprocating, or to-and-fro, motion causes the cutting blade 22 to chop the grass sod S from the grass land thereby enhancing removal of the grass sod S. Preferably, the to-and-fro motion of the cutting blade 22 is produced by a pair of cams 90 positioned adjacent opposite ends of the driven axle 12. The opposite ends of the driven axle 12 are connected to bearings 92 positioned on opposite sides of the chassis 4. Connecting arms 94 are connected between the cams 90 and the struts 74. Each connecting arm 94 is pivotally connected to one of the struts 74 by a connecting pin 96 and the end of each connecting arm 94 opposite the strut 74 has a bearing 98 which receives the cam 90 therein. Rotating the driven axle 12 causes the cams 90 to drive the connecting arms 94 reciprocatingly between the front end 10 and the back end 20 of the chassis 4. The reciprocating motion of the connecting arms 94 causes the struts 74 to move reciprocatingly whereby the cutting blade 22 is moved to and fro.

With reference to FIG. 6, in an alternate embodiment, the ground profile detector GD for detecting the profile of the grass sod S includes a plurality of proximity sensors 100 positioned across the front end 10 of the chassis 4. Each proximity sensor 100 can be a capacitive proximity sensor, such as Model No. SK1-25-34-PbS manufactured by SIE Sensors, Inc. of Toledo, Ohio, or an ultrasonic sensor, such as Model No. UP 500 PVPS 24 IS manufactured by SNT Sensortechnik AG of Switzerland, or a combination thereof. The proximity sensors 100 can be connected to the controller C and utilized in the manner of the running wheels 46 and the potentiometers 52 to detect the profile of the grass sod S. Similarly, as shown in FIG. 4, proximity sensors 102 can be positioned laterally between the sides of the chassis 4 between the cutting blade 22 and the conveyer 16. The sensors 102 are like the sensors 100 and can be utilized to detect the thickness of the cut grass sods CS by detecting a distance between a bottom surface of the cut grass sod CS and a reference position, such as the measuring wheels 66, on the top surface of the cut grass sods CS. Combinations of the sensors 100, the running wheels 46 and/or the sensors 102 can also be utilized.

The invention has been described with reference to the preferred embodiments. Obvious modifications and altereations will occur to others upon reading and understanding the preceding detailed description. It is intended that the invention be construed as including all such modifications and alterations insofar as they come within the scope of the appended claims or the equivalents thereof.

I claim:

1. A sod cutting apparatus for cutting a grass sod from a grass land, the sod cutting apparatus comprising:

a chassis having a front end and a back end;

a cutting blade having a cutting edge, with the cutting blade positioned on the chassis so that the cutting edge cuts the grass sod when the chassis is moved relative to the grass land;

an adjusting mechanism positioned between the chassis and the cutting blade, with the adjusting mechanism configured to adjust the position of the cutting blade to set the cutting edge a predetermined distance below a surface of the grass sod;

a measuring mechanism which measures at least one of a profile of the grass sod to be cut from the grass land and a thickness of the cut grass sod; and a controller connected to the measuring mechanism and the adjusting mechanism, with the controller causing the adjusting mechanism to adjust the position of the cutting blade in response to the measuring mechanism detecting changes in at least one of the profile of the grass sod to be cut from the grass land and the thickness of the grass sod cut from the grass land.

2. The apparatus as set forth in claim 1, wherein the controller causes the adjusting mechanism to adjust the position of the cutting blade so that the cut grass sod has a substantially uniform longitudinal thickness.

3. The apparatus as set forth in claim 1, wherein:

the cutting blade is flexible;

the adjusting mechanism includes a flexion adjusting mechanism configured to selectively adjust the flexion of the cutting blade; and in response to the measuring mechanism detecting changes in at least one of a lateral profile of the grass sod to be cut from the grass land and a lateral thickness of the cut grass sod, the controller causes the flexion adjusting mechanism to selectively adjust the flexion of the cutting blade.

4. The apparatus as set forth in claim 3, wherein the controller causes the flexion adjusting mechanism to selectively adjust the flexion of the cutting blade so that the cut grass sod has a substantially uniform lateral thickness.

5. The apparatus as set forth in claim 3, wherein:

a central part of the cutting blade is secured to the adjusting mechanism; and the flexion adjusting mechanism includes a pair of adjusting cylinders, with one adjusting cylinder connected to one end of the cutting blade, with the other adjusting cylinder connected to the other end of the cutting blade, with each adjusting cylinder connected to the controller to be selectively controlled thereby.

6. The apparatus as set forth in claim 1, wherein the adjustment mechanism further includes:

a running wheel connected adjacent the front end of the chassis and rollable over and movable normal to a surface of the grass land; and a ground profile potentiometer coupled to the running wheel for detecting movement of the running wheel normal to the surface of the grass land, with the ground profile potentiometer connected to supply the controller with an indication of such movement.

7. The apparatus as set forth in claim 1, further including a carriage wheel rotatably positioned on the chassis, wherein the adjustment mechanism further includes:

a measuring wheel rotatably connected to the chassis adjacent the carriage wheel, with the measuring wheel and the carriage wheel positioned for receiving the cut grass sod therebetween, with the measuring wheel movable normal to the surface of the cut grass sod received between the measuring wheel and the carriage wheel; and a thickness potentiometer coupled to the measuring wheel for detecting movement of the measuring wheel normal to the surface of the cut grass sod passing between the carriage wheel and the measuring wheel.

8. The apparatus as set forth in claim 1, wherein the adjusting mechanism includes:

a strut movably connected between the chassis and the cutting blade;

a cutting blade adjustment cylinder coupled to the strut for moving the strut relative to the chassis; and a cutting blade potentiometer coupled to the strut for detecting the position of the strut relative to the chassis and for providing to the controller an output indicative of such position, wherein the controller adjusts the position of the strut relative to the chassis as a function of the output of the cutting blade potentiometer whereby the position of the cutting blade is adjusted to maintain the cutting edge at the predetermined distance below the surface of the grass sod to be cut from the grass land.

9. The apparatus as set forth in claim 8, further including a reciprocating mechanism coupled to the strut for moving the cutting edge to and fro to cut the grass sod from the grass land.

10. An apparatus for cutting a grass sod from a grass land, the apparatus comprising:

a chassis having a front end and a back end;

a cutting blade which cuts the grass sod;

an adjusting mechanism which receives the cutting blade and which is coupled to the chassis, with the adjusting mechanism adjusting the position of the cutting blade to cut the grass sod a predetermined distance below a surface of the grass sod;

measuring mechanism for measuring at least one of a profile of the grass sod to be cut from the grass land and for measuring a thickness of the cut grass sod; and a controller connected to the measuring mechanism and the adjusting mechanism, with the controller causing the adjusting mechanism to adjust the position of the cutting blade in response to the measuring mechanism detecting changes in at least one of the profile of the grass sod to be cut from the grass land and the thickness of the grass sod cut from the grass land.

11. The apparatus as set forth in claim 10, wherein the measuring mechanism includes at least one of:

a ground profile detector positioned between the cutting blade and the front end of the chassis for detecting a profile of the surface of the grass sod to be cut from the grass land; and a sod thickness detector positioned between the cutting blade and the back end of the chassis for detecting a thickness of the cut grass sod.

12. The apparatus as set forth in claim 11, wherein:

the ground profile detector includes at least one of (i) a running wheel rollable on and movable normal to a surface of the grass sod to be cut from the grass land, a ground profile potentiometer coupled to the running wheel and having an output that changes in response to movement of the running wheel normal to the surface of the grass sod to be cut from the grass land, (ii) a capacitive proximity sensor, and (iii) an ultrasonic proximity sensor; and the sod thickness detector includes at least one of (i) a carriage wheel and a measuring wheel positioned for receiving the cut grass sod therebetween, with the measuring wheel movable normal to the surface of the cut grass sod received between the measuring wheel and the carriage wheel, and a thickness potentiometer coupled to the measuring wheel and having an output that changes in response to movement of the measuring wheel normal to the surface of the grass sod received between the measuring wheel and the carriage wheel, (ii) a capacitive proximity sensor, and (iii) an ultrasonic proximity sensor.

13. The apparatus as set forth in claim 12, wherein:

the ground profile detector includes at least one of (i) a plurality of running wheels, with each running wheel having a ground profile potentiometer coupled thereto, (ii) a plurality of capacitive proximity sensors, and (iii) a plurality of ultrasonic proximity sensors; and the sod thickness detector includes at least one of (i) a plurality of measuring wheels positioned adjacent at least one carriage wheel, with each measuring wheel having a thickness potentiometer coupled thereto, (ii) a plurality of capacitive proximity sensors, and (iii) a plurality of ultrasonic proximity sensors.

14. The apparatus as set forth in claim 10, wherein:

the cutting blade is flexible; and the controller causes the adjusting mechanism to adjust the flexion of the cutting blade in response to the measuring mechanism detecting changes in at least one of a lateral profile of the grass sod to be cut from the grass land and a lateral thickness of the cut grass sod.

15. A method of cutting from a grass land a grass sod having a predetermined thickness, the method comprising the steps of:

setting a cutting blade to cut from the grass land the grass sod having the predetermined thickness;

positioning a sensor to detect during cutting of the grass sod from the grass land at least one of a profile of the grass sod to be cut and a thickness of the cut grass sod;

detecting a change of an electrical charateristic of the sensor in response to variations in the at least one of the profile and the thickness of the cut grass sod; and in response to detecting a change in the electrical characteristic of the sensor, adjusting the cutting blade to maintain the cut grass sod at the predetermined thickness.

* * * * *

UNITED STATES PATENT AND TRADEMARK OFFICE
CERTIFICATE OF CORRECTION

PATENT NO. : 6,244,354 B1
APPLICATION NO. : 09/489129
DATED : June 12, 2001
INVENTOR(S) : Johannes Van Vuuren It is certified that error appears in the above-identified patent and that said Letters Patent is hereby corrected as shown below:

Column 1 Line 43, "costs moreover," should read --costs. Moreover, --.

Column 5 Line 22 "and the like" should read --dials and the like--.

Column 7 Line 27 "altereations" should read --alterations--.

Signed and Sealed this

Eighth Day of August, 2006

JON W. DUDAS
*Director of the United States Patent and Trademark Office*